United States Patent [19]
Dahlquist

[11] 3,832,060
[45] Aug. 27, 1974

[54] METHOD OF PREPARING ANALYTE MATERIAL FOR SPECTROCHEMICAL ANALYSIS

[75] Inventor: Ralph L. Dahlquist, Santa Barbara, Calif.

[73] Assignee: Applied Research Laboratories, Inc., Sunland, Calif.

[22] Filed: Aug. 10, 1972

[21] Appl. No.: 279,619

[52] U.S. Cl.................. 356/36, 356/74, 356/85
[51] Int. Cl. ............................................. G01n 1/00
[58] Field of Search............... 356/36, 38, 85–87, 356/187; 55/74

[56] References Cited
UNITED STATES PATENTS
3,174,393  3/1965  Dewey et al. ..................... 356/187
3,419,359  12/1968  Anderson et al. ............... 356/87 UX
3,693,323  9/1972  Gant .................................. 55/74 X

*Primary Examiner*—John K. Corbin
*Assistant Examiner*—F. L. Evans
*Attorney, Agent, or Firm*—Theodore H. Lassagne

[57] ABSTRACT

An analyte material is prepared for spectrochemical analysis by depositing it in solution or electrostatically precipitating it upon a previously purged yarn of finely divided carbon fibers, dessicating it in situ, and electrically heating the yarn sufficiently to vaporize the analyte material while passing a gas stream over it in which the analyte material is condensed in particles of sufficiently small size to form an aerosol which is then conducted to any of a variety of excitation sources for spectrochemical analysis.

12 Claims, 1 Drawing Figure

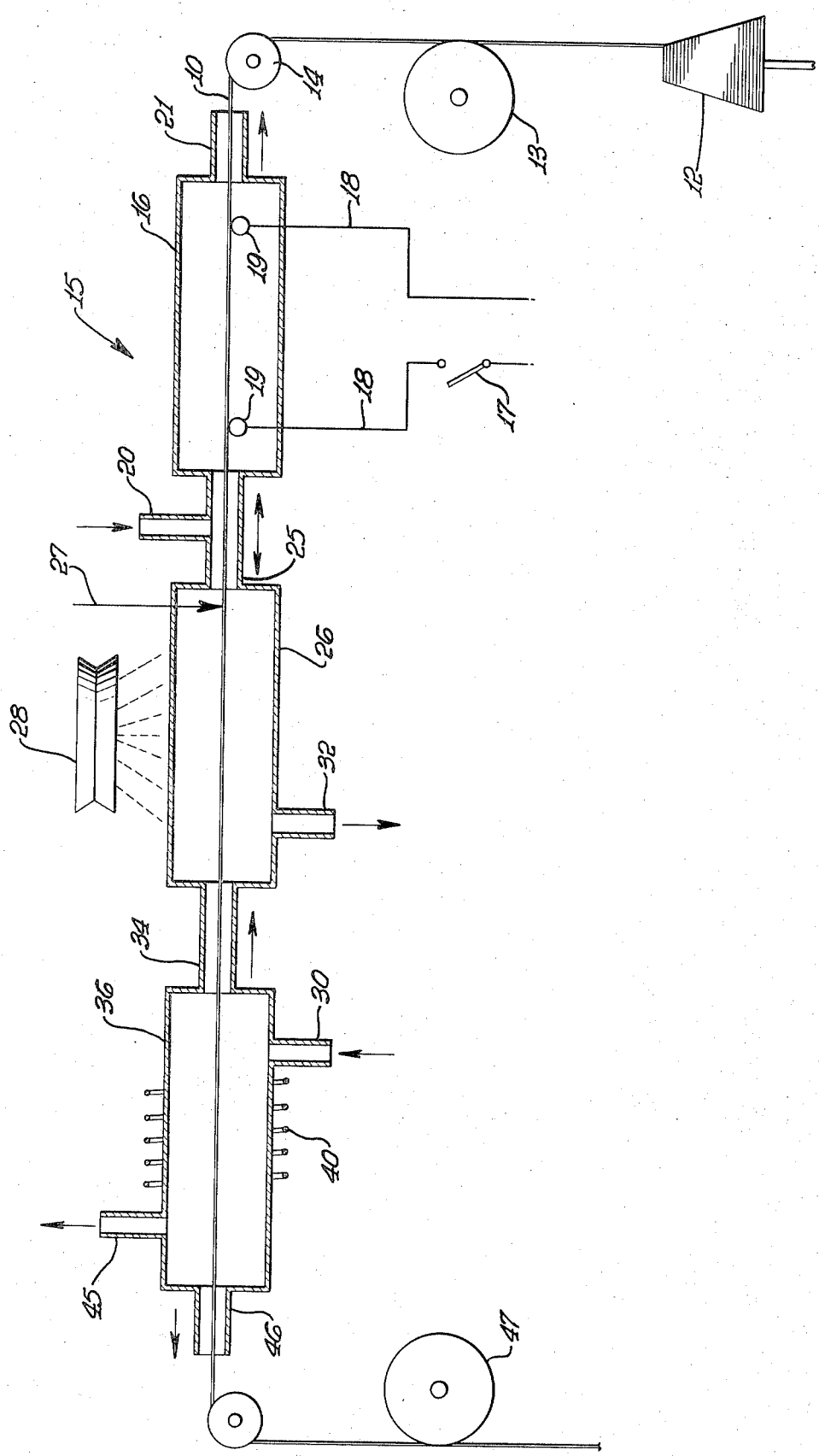

METHOD OF PREPARING ANALYTE MATERIAL FOR SPECTROCHEMICAL ANALYSIS

BACKGROUND OF THE INVENTION

1. Field of the Invention

The present invention relates to a method of preparing analyte materials for spectrochemical analysis and more particularly to such a method which is compatible with the requirements of various conventional analytical modes such as, for example, atomic emission, atomic absorption and atomic fluorescence.

2. Description of the Prior Art

Spectrochemical analysis is among the most sensitive of all analytical methods, a few milligrams of a sample usually sufficing for the detection of elements present to the extent of only parts per million. For this reason it is widely used in analytical and clinical chemistry where extremely small sample volumes are available.

In spectrochemical analysis, atoms of an analyte; i.e., a sample of the material to be analyzed, are excited to energy levels above their normal, or ground, states and caused to emit or absorb light of characteristic frequencies as they return to lower energy states. These characteristic frequencies are separated into an ordered sequence, or spectrum, by diffraction or refraction for observation and/or recording. Each chemical element has a unique, characteristic collection of spectral frequencies whose presence, or absence, in the spectrum of an unknown substance presented for analysis provides unambiguous evidence of the presence of that element.

The preparation of materials for spectrochemical analysis has conventionally been effected by nebulization of solutions of such materials into liquid droplets which are then introduced into a flame or other excitation medium. However, analytical results obtained by such nebulization are subject to many effects deleteriously affecting accuracy of the result. Viscosity, volatility and surface tension affect nebulizer efficiency and hence analytical results.

Alternatively, analyte material has been coated directly on carbon or metal tubes or filaments which have then been heated, usually electrically, to effect atomization and excitation of the atoms of the material in a single step. This procedure, however, has required preparation of the tube or filament by preheating for extended periods to diffuse to the surface and evaporate impurities and, desirably, metallic coating of the tube or filament, if of carbon, has been required to prevent too rapid a diffusion of atomic vapor into the carbon. Such devices all serve as atom reservoirs and are used principally in absorption or fluorescence spectrocopy, although microwave plasmas are sometimes employed as emission sources where the sample is evaporated from a metal filament.

Dewey et al. in U.S. Pat. No. 3,174,393 of Mar. 23, 1965 describe the employment of a cloth of fine carbon fibers as a vehicle by means of which analyte material deposited thereon in either aerosol or liquid form may be exposed to a flame or arc, or heated by a current passed through the cloth itself, to effect excitation of atoms of the analyte for emission spectroscopy, while West et al., in "Atomic Absorption and Fluorescence Spectropscopy with A Carbon Filament Atom Reservoir" published in *Analytica Chimica Acta*, 45 (1969) 27–41, describe various configurations of apparatus for the excitation of analyte materials in atomic absorption and atomic fluorescence spectroscopy.

It is a primary object of the present invention, however, to provide a method and apparatus for the preparation of analyte materials for spectrochemical analysis which is independent of the procedure employed in the analysis itself and therefore is equally useful in atomic emission, atomic absorption and atomic fluorescence spectroscopy.

SUMMARY OF THE INVENTION

According to the present invention, an analyte is divided into minute separate particles; i.e., "particulated," without necessarily being atomized in the sense of dissociated into free, single, neutral atoms, and without being nebulized in the sense of being formed into liquid droplets.

So particulated, the analyte is conveyed by a stream of gas to any selected excitation medium for spectral analysis. Such analysis can be effected in any of three analytical modes; e.g., atomic absorption, atomic fluorescence, or atomic emission, because the sample preparation and its excitation are wholly independent of each other.

The particulation medium employed for this purpose is a yarn of fine fibers of high purity graphitic carbon characterized by high thermal and good electrical conductivity, adapting it for resistance heating by passage of an electric current through it.

After a very brief pre-burn, analyte material is deposited directly on the yarn which can accommodate relatively large quantities, of the order of three microliters per centimeter of length, of liquid analyte due to its capillarity. Thus the analyte material is spread over an enormous surface as compared with the area over which it may be spread in other non-flame devices. This facilitates and expedites desolvation.

Desolvation is accomplished by heating the yarn to a temperature sufficient only to evaporate the solvent and to remove minimal amounts of water of crystallization. If mercury or other volatile elements are believed present in the analyte, special care if of course required in this step as with other techniques for analyte preparation.

Alternatively, in applications where it is desired to effect spectrochemical analysis of minute particles carried in the air or in gaseous discharges from industrial processes, a length of the electrically conductive yarn may be employed as the collector element in an electrostatic precipitator, in which case the particles collecting on the individual fibers of the yarn will constitute the analyte material.

Desolvation in the sense of evaporation of a solvent is not of course necessary in the preparation of analytes deposited on yarn in an electrostatic precipitator, but dessication of the analyte to some predetermined relative humidity can, if desired, be effected by heating the yarn carrying the electrostatically deposited analyte to a temperature sufficient only for that purpose.

Following the deposition of the analyte material on the fibers of the yarn in either of the ways described above, the yarn is heated to a temperature sufficiently high to evolve the analyte material in aerosol form from its surface, during which a stream of a carrier gas at a lower temperature is flowed over the surface of the yarn carrying the aerosol analyte material from the surface of the yarn fibers to a selected excitation medium which may be located at any convenient distance from the apparatus in which the particulation of the analyte is effected. The temperature to which the yarn is heated for this purpose is sufficient to apparently vaporize the analyte material which is then instantly condensed in the stream of carrier gas into particles of sufficiently small size to form an aerosol.

BRIEF DESCRIPTION OF THE DRAWING

The FIGURE is a diagrammatic illustration of apparatus for preparation of an analyte according to the method of the present invention; the arrows therein indicated directions of gas flows.

DESCRIPTION OF THE PREFERRED EMBODIMENT

According to the method of the present invention the material to be analyzed is deposited upon the surfaces of the fibers composing a length of yarn of high purity vitreous graphitic carbon fibers a majority of which are, typically, of diameters in the range of four to eight microns.

Such vitreous graphitic fibers have been produced by processing carbonaceous materials at temperatures up to 3,000° C. They are stable up to about 3,600° C. at which temperature they sublime without melting. Yarn formed of such fibers is of great strength and retains its strength at elevated temperatures. It is electrically conductive and therefore can be heated by induction or by the passage of an electrical current through it. One such yarn is marketed by Union Carbide Corporation under the trademark "Thornel."

Preliminarily, this yarn is purged by heating it in an inert atmosphere, preferably by the passage of an electrical current through it, to a temperature sufficient only to diffuse to and evaporate from the surface of the fibers any impurities present; a stream of inert gas, such as nitrogen, being flowed over the surface of the yarn fibers during such heating to carry away vaporized materials evolved. Because the individual fibers composing the yarn are so small and finely divided, the yarn comes to firing temperature very quickly and the diffusion of impurities out of the material and their evaporation from the surface thereof occurs in only a few seconds as contrasted with the many minutes required for impurities to diffuse to the surface and be evaporated from more massive structures such as conventional non-flame cells. It has been found, therefore, that with "Thornel" yarn, such as described above, a five second pre-burn period reduces impurities to non-detectable levels; i.e., less than $10^{-13}$ grams absolute. Also because of the vitreous nature of the yarn, provisions for the avoidance of soak-in and diffusion are unnecessary.

Following such purging, material to be analyzed, i.e., the analyte, is deposited on the surfaces of the fibers composing the yarn. Where the analyte material is in liquid form, it will be observed that the yarn can accommodate relatively large quantities, of the order of three microliters per centimeter of length, of liquid analyte due to its capillarity. Thus the analyte material is spread over an enormous surface as compared with the area over which it may be spread in conventional non-flame devices. This facilitates and expedites drying and ashing of analyte solutions without splatter or crusting losses.

Alternatively, in applications where it is desired to effect spectrochemical analysis of minute particles carried in the air or in gaseous discharges from industrial processes, such particles may be deposited on the surfaces of the fibers composing the yarn by employing a length of the previously purged yarn as an electrically charged collector element in an electrostatic precipitator through which the air or gaseous discharge is passed. The particles of materials to be analyzed are thus collected on the surfaces of the yarn fibers and separated from the gaseous constituents of the atmosphere in which they were carried.

Following the deposition of an analyte in liquid form, as described above, the analyte-impregnated yarn is again heated in an inert atmosphere, preferably by the passage of an electrical current through the yarn to a temperature sufficient to evaporate the solvent present without dislodging the analyte material from the surfaces of the yarn fibers. During this step also, a stream of an inert gas, such as nitrogen, is flowed over the surface of the yarn fibers so as to carry away vaporized materials evolved during such heating of the yarn.

This desolvation step is not necessary and may be omitted in connection with the preparation for analysis of materials electrostatically deposited on the yarn, although some dessication of electrostatically deposited analyte material may be effected to bring it to a desired relative humidity.

Finally, following desolvation or dessication, the yarn is heated once again to a temperature sufficient to vaporize analyte material from the surfaces of the yarn fibers. During this heating, a stream of gas at a temperature at which the vaporized analyte material instantly condenses is flowed over it and conducted from that space to any of a variety of excitation sources at which the finely particulated analyte material carried away from the surfaces of the yarn fibers may be excited for spectrochemical analysis.

It will be evident from the foregoing that the present method of preparing analyte materials for spectrochemical analysis is entirely separate and independent of the analysis itself and that therefore it is useful with any of a variety of analytical techniques such as, for example, atomic absorption, atomic fluorescence or atomic emission.

Furthermore, the method of the present invention is adapted for employment in the continuous analysis of materials which may be in either liquid form or in the form of solid particles carried in the atmosphere or gaseous discharges from industrial processes, or the like.

As diagrammatically illustrated in the FIGURE, liquid analyte materials may be prepared for continuous spectrochemical analysis by continuously feeding yarn 10 of the kind which has been described herein, from a supply reel 12 around a tension capstan 13 and over a pulley 14 into a tube 15.

In a first portion 16 of the interior of the tube 15, a length of yarn 10 is heated to a temperature of the order of 2,300° C. for from two to five seconds by an electrical current passed through it under control of a switch 17 from a suitable source via leads 18 to contacts such as carbon rollers 19 contacting the yarn 10.

During such heating, an inert gas such as, for example, nitrogen, is flowed through the portion 16 of the tube 15; being introduced from any suitable source via inlet 20 and discharged via outlet 21. Impurities evaporated by such heating from the surfaces of the fibers composing the yarn are carried away by this gas flow.

The continuously fed yarn then passes through the intermediate portion 25 into another portion 26 of the interior of the tube 15. In this portion 26 of the tube 15, a liquid analyte is continuously deposited upon the yarn 10 during its movement by means diagrammatically illustrated at 27. During its movement through the portion 26, the yarn 10 is heated to, typically, 80° C. by means such as a source of radiant heat 28, such temperature being only sufficient to effect evaporation of any solvent present.

During such heating, an inert gas, such as, for example, nitrogen, is flowed through the portion 26 of the tube 15; being introduced from any suitable source via inlets 20 and 30 and discharged via outlet 32. The evaporable constituents of the analyte solution are carried away by this gas flow and the remaining analyte material is dried by the radiant heat.

The continuously fed yarn then passes through the intermediate portion 34 into a third portion 36 of the interior of the tube 15. During its movement through this portion of the tube 18, the yarn is again heated to a temperature of 2,000° c. by a high frequency electrical current passed through a coil 40 surrounding the portion 36 of the tube 15.

During such heating analyte material is vaporized and then recondensed instantly in extremely finely divided particles which are carried away from the surface of the fibers composing the yarn 10 by a stream of a carrier gas which may be either an inert gas such as, for example, nitrogen, or, where a flame is to be used for excitation of the analyte in a concurrent spectrochemical analysis, a reducing gas combustible in the presence of oxygen but inert with respect to the analyte material itself in the absence of oxygen. This gas is supplied at essentially room temperature through the inlet 30 and aspirated, together with the entrained analyte particles, to any desired excitation source through outlet 45, an excess discharging through outlet 46. The yarn 10 then passes through the outlet 46 and over a take-up capstan 47.

For the continuous preparation for analysis of materials in the form of solid particles carried in the atmosphere or in gaseous discharges from industrial processes and the like, yarn, after purging by means such as has been described, is removed from the apparatus and employed as a collector element in an electrostatic precipitator until sufficient analyte material has been collected on its fibers; the electrically conductive yarn being electrically charged during such precipitation. Thereafter it is reintroduced into apparatus corresponding to the tube portions 26 and 36 and associated elements for dessication of the analyte to the desired relative humidity and its particulation.

In the foregoing description the means for heating the yarn in the portions 16 and 36 of the tube 15 are given as examples only, either of which may be substituted for the other or for the heating means described for heating the yarn in the portion 26 of the tube 15 provided only that in the latter case the electrical current is controlled to effect heating only to the lower temperature required for desolvation and/or dessication.

What is claimed is:

1. A method of preparing analyte materials for spectrochemical analysis which comprises the steps of depositing analyte material in the solid state on the surfaces of the fibers of a yarn composed of fibers of high purity graphitic carbon a majority of which fibers are typically of diameters in the range of four to eight microns, heating said yarn to a temperature sufficient to vaporize said solid analyte material, condensing said vaporized material into solid particles of sufficiently small size to form an aerosol and transporting such particles for spectrochemical analysis to a location optically remote from said yarn by passing a stream of gas over said yarn during said heating.

2. A method according to claim 1 in which the heating of said yarn is effected by passing an electrical current therethrough.

3. A method according to claim 1 in which the heating of said yarn is effected by induction.

4. A method according to claim 1 in which the steps described are performed in a continuous sequence while moving said yarn between and through separate zones in each of which one of said steps is performed.

5. A method according to claim 1 in which the deposition of analyte material on the surfaces of the fibers of said yarn is effected by imposing an electrical charge upon said yarn while exposing it to an atmosphere containing particles in the solid state of material to be analyzed.

6. A method according to claim 5 in which the heating of said yarn is effected by passing an electrical current therethrough.

7. A method according to claim 5 in which the heating of said yarn is effected by induction.

8. A method according to claim 5 in which the steps described are performed in a continuous sequence while moving said yarn between and through separate zones in each of which one of said steps is performed.

9. A method according to claim 1 in which said analyte material is first deposited on the surfaces of said fibers in solution in a solvent and which includes the additional step of heating said yarn only sufficiently to evaporate said solvent prior to heating said yarn to a higher temperature sufficient to evolve the analyte material therefrom.

10. A method according to claim 9 in which the heating of the yarn is effected by passing an electrical current therethrough.

11. A method according to claim 9 in which the heating of the yarn is effected by induction.

12. A method according to claim 9 in which the steps described are performed in a continuous sequence while moving said yarn between and through separate zones in each of which one of said steps is performed.

* * * * *